April 20, 1937.                W. N. PESCE                2,077,953
                                NUT LOCK
                           Filed Feb. 7, 1936

INVENTOR
William N. Pesce.
BY  H. G. Manning
ATTORNEY

Patented Apr. 20, 1937

2,077,953

UNITED STATES PATENT OFFICE 2,077,953

NUT LOCK

William N. Pesce, Waterbury, Conn.

Application February 7, 1936, Serial No. 62,767

3 Claims. (Cl. 151—12)

This invention relates to nut locks, and more particularly to a nut provided with means to releasably lock it against rotation in either direction on a bolt having longitudinal grooves, and which may be set so that it may be rotated only in one direction.

One object of this invention is to provide a nut of the above nature having a pawl pivotally carried therein, and which may be releasably locked either in inoperative position or in nut-locking position.

A still further object is to provide a nut lock of the above nature which will be comparatively simple in construction, substantially inexpensive to manufacture, easy to install and manipulate, compact, and efficient and durable in use.

With these and other objects in view, there has been illustrated on the accompanying drawing, one form in which the invention may be conveniently embodied in practice.

Figure 1:
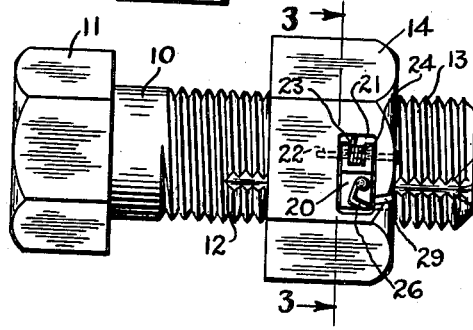
Fig. 1 is a side view of a bolt and nut lock combination embodying the features of this invention.
Figure 2:
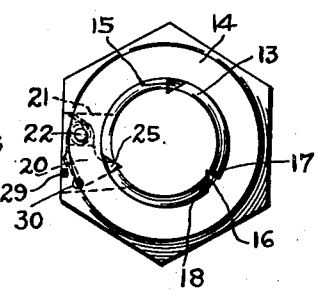
Fig. 2 is an end view of the same.

Referring now to the drawing in which like reference numerals denote corresponding parts throughout the several views, the bolt and nut combination selected to illustrate the features of this invention is shown in assembled position in Figs. 1 and 2, where the numeral 10 indicates a bolt having a hexagonal head 11 and a shank 12, provided with a threaded portion 13. A hexagonal nut 14 having internal threads 15 is screwed upon the threaded bolt shank 12 in the usual manner. The bolt shank 12 has a plurality of V-grooves 16 (three in this instance) cut or otherwise formed therein, which extend longitudinally thereof and are spaced apart circumferentially thereabout. The V-grooves 16 are preferably formed with one side 17 disposed radially with respect to the axis of the bolt and with the other side 18 of said grooves inclined at an angle thereto. The depth of said grooves is preferably made slightly greater than the depth of the threads 13.

The locking member for the nut 14 comprises a pawl 20 which is pivotally mounted on a pin 22 within a radially disposed rectangular opening 21 in said nut so that it may swing toward and away from the bolt shank 12. The pivoted end of the pawl 20 is bifurcated, as at 23, and embraces a coiled spring 24 which is mounted on the pin 22. One end of said spring engages the nut 14 and the other end engages the pawl 20, whereby the latter will be urged inwardly toward the bolt shank 12. The free end of the pawl 20 is pointed, as at 25, for engaging in any one of the V-grooves 16 in the bolt shank 12.

Figure 3:
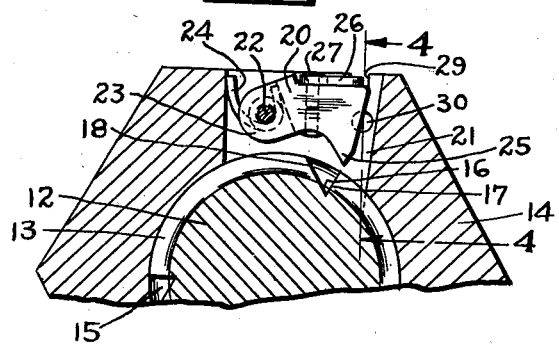
Fig. 3 is an enlarged partial sectional view of the lock-nut and bolt generally taken on line 3—3 of Fig. 1, looking in the direction of the arrows, showing the pawl locked in inoperative position.
Figure 4:
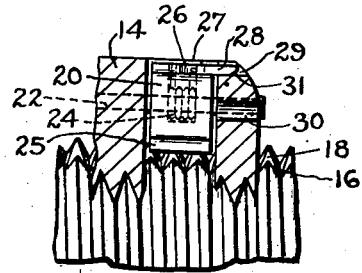
Fig. 4 is a partial sectional view taken along the line 4—4 of Fig. 3.
Figure 5:
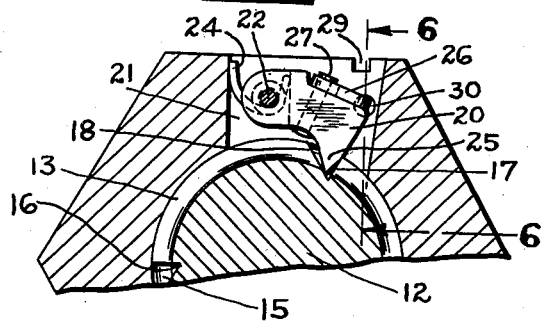
Fig. 5 is a partial sectional view similar to Fig. 3, but showing the pawl in nut-locking position.

An angular catch 26 is pivotally mounted upon a pin 27 located on the outer surface of the pawl 20, and said catch is adapted to swing laterally with respect to the pawl 20. The catch 26 is provided with a hook arm 28 which is adapted to enter a longitudinal groove or slot 29 (see Figs. 1, 3 and 4) formed in a peripheral surface of one face of the nut 14 for preventing the pawl 20 from swinging inwardly upon the pivot pin 22. The hook arm 28 is also adapted to engage in a longitudinal opening 30 (see Figs. 3 to 6), provided in the nut 14 spaced inwardly from the groove 29, and extending into the opening 21, whereby the pawl 20 may be maintained in its locked position within the V-grooves 16 and held positively against accidental release therefrom. The hook arm 26 is provided at its end with a beveled edge 31, to facilitate the entrance thereof into the slot 29 and opening 30.

Figure 6:
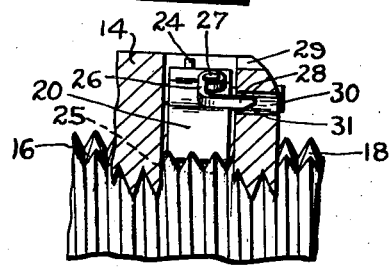
Fig. 6 is a sectional view taken on line 6—6 of Fig. 5.

In operation, assuming the nut 14 has been screwed upon the threaded portion 13 of the bolt 10, and that the pointed end 25 of the pawl 20 is engaged in one of the V-grooves 16 with the catch 26 in the inoperative position, as shown in Fig. 1, the nut may be rotated in a clockwise direction, as viewed in Fig. 2, but will be held against rotation in a counterclockwise direction if one attempts to remove it from the bolt shank 12. After having advanced the nut 14 along the shank 12 the desired amount, the catch hook 26 may be swung about its pivot to cause the arm 28 thereof to enter the opening 30 in the nut, as shown in Fig. 6, whereupon it will be impossible to rotate the nut on the shank in either direction.

When it is desired to unscrew the nut 14 from the bolt shank, it will only be necessary to unlatch the hook catch 26 and twist the nut anticlockwise sufficiently to cause the pointed end 25 of the pawl 20 to slide up the inclined side 18 of the V-groove 16 and come to rest upon the circumference of the threaded portion 13. The catch 26 may then be swung in a counter-clockwise direction until the arm 28 thereof enters the groove 29, whereupon the pawl 20 will be held in its outermost inoperative position, permitting the nut to be freely unscrewed from the bolt.

While there has been disclosed in this specification one form in which this invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In combination, a threaded bolt having longitudinal grooves in its threaded portion, a nut screwed upon said bolt, means carried by said nut and adapted to selectively cooperate with any of said grooves to prevent rotation of said nut in one direction, and means carried by said first means and engageable with said nut when said first means is in engagement with the groove to prevent rotation of said nut in either direction, said second means being engageable with said nut when said first means is out of engagement with said groove to permit rotation of said nut in either direction.

2. In combination, a threaded bolt having a longitudinal groove on its periphery, a nut screwed on said bolt, a pawl on said nut adapted to engage one of said grooves to prevent rotation of said nut thereon in one direction, and a catch swingably mounted on said pawl and adapted to engage in an opening in said nut when said pawl is engaged in a groove to lock said nut against rotation in one direction, said nut having a recess to receive said catch when said pawl is out of groove-engaging position to permit rotation of said nut in either direction.

3. In combination, a bolt and a nut screwed thereon, a pawl mounted on said nut for swinging movement toward and away from said bolt, a spring constantly urging said pawl toward said bolt, said pawl adapted to interlock with said bolt to prevent rotation of said nut thereon, said nut having a groove in its periphery and a longitudinally directed opening therein spaced inwardly from its periphery, a catch pivoted to said pawl for swinging movement transverse to the swinging movement of said pawl, and an arm on said catch adapted to enter the groove in said nut when said pawl is out of engagement with said bolt and to enter the opening in said nut when said pawl is in engagement with said bolt.

WILLIAM N. PESCE.